US012739251B2

(12) United States Patent
Meyers et al.

(10) Patent No.: US 12,739,251 B2
(45) Date of Patent: Sep. 15, 2026

(54) PUBLISHER PERMISSIONED ACTIVATION IN COOKIELESS AUTHENTICATION ENVIRONMENT

(71) Applicant: LiveRamp, Inc., San Francisco, CA (US)

(72) Inventors: Ian Meyers, Berkeley, CA (US); Julien Weber, Brooklyn, NY (US); Travis Cadorette, Miami, FL (US); Stevan Boddanovic, Petrovaradin (RS)

(73) Assignee: LiveRamp, Inc., San Francisco, CA (US)

( * ) Notice: Subject to any disclaimer, the term of this patent is extended or adjusted under 35 U.S.C. 154(b) by 0 days.

(21) Appl. No.: 18/579,615

(22) PCT Filed: Jul. 8, 2022

(86) PCT No.: PCT/US2022/036451

§ 371 (c)(1),
(2) Date: Jan. 16, 2024

(87) PCT Pub. No.: WO2023/003699

PCT Pub. Date: Jan. 26, 2023

(65) Prior Publication Data

US 2024/0323190 A1 Sep. 26, 2024

Related U.S. Application Data

(60) Provisional application No. 63/224,021, filed on Jul. 21, 2021.

(51) Int. Cl.
*H04L 9/40* (2022.01)
*H04L 9/08* (2006.01)

(52) U.S. Cl.
CPC ............. *H04L 63/10* (2013.01); *H04L 9/088* (2013.01)

(58) Field of Classification Search
None
See application file for complete search history.

(56) References Cited

U.S. PATENT DOCUMENTS 9,397,983 B2 7/2016 Moffat
9,798,895 B2 10/2017 Nayshtur et al.
(Continued)

FOREIGN PATENT DOCUMENTS

CN 112088374 A 12/2020
KR 101248296 B1 3/2013
(Continued)

OTHER PUBLICATIONS

Machine translation of CN112088374A.
(Continued)

*Primary Examiner* — Jeffrey R Swearingen

(57) ABSTRACT

A system enables a publisher to specify access to people-based identifiers in a cookieless authentication environment. By giving the publisher the ability to grant access to these identifiers only to trusted parties, data leakage is greatly reduced. Permission is controlled by encrypting the same identifiers using one of a plurality of keys, so that only those parties to whom the publisher desires to give access associated with a particular key may access the information. An application programming interface operated by a resolution vendor accepts publisher identifiers and, after resolution of those identifiers into persons, returns envelope data structures that contain encrypted identifiers for persons. A sidecar process handles decryption and re-encryption of the envelopes as needed to support the identification environment.

22 Claims, 3 Drawing Sheets

(56) References Cited

U.S. PATENT DOCUMENTS

| | | | |
|---|---|---|---|
| 9,979,614 B2 | 5/2018 | Kalus et al. | |
| 10,129,211 B2 | 11/2018 | Heath | |
| 10,776,831 B2 | 9/2020 | Maher et al. | |
| 10,902,473 B2 | 1/2021 | Beck et al. | |
| 11,030,341 B2 | 6/2021 | LaFever et al. | |
| 11,049,148 B2 | 6/2021 | Lawbaugh et al. | |
| 2012/0204032 A1 | 8/2012 | Wilkins et al. | |
| 2013/0060601 A1 | 3/2013 | Kodialam et al. | |
| 2013/0232339 A1 | 9/2013 | Ignatchenko et al. | |
| 2014/0278972 A1* | 9/2014 | Yonebahashi ...... | G06Q 30/0255 705/14.53 |
| 2015/0112803 A1 | 4/2015 | Keiser, II et al. | |
| 2015/0332338 A1 | 11/2015 | Chelko et al. | |
| 2016/0292431 A1 | 10/2016 | Sreekanti et al. | |
| 2020/0160388 A1 | 5/2020 | Sabeg et al. | |
| 2020/0394332 A1 | 12/2020 | Jakobsson et al. | |
| 2021/0090126 A1 | 3/2021 | Schobeiri et al. | |
| 2022/0337562 A1* | 10/2022 | Sonawalla .......... | H04L 63/0428 |
| 2022/0405407 A1* | 12/2022 | Bai ........................ | G06N 20/00 |
| 2022/0405462 A1* | 12/2022 | Nahum ................. | H04L 67/146 |

FOREIGN PATENT DOCUMENTS

| | | | |
|---|---|---|---|
| WO | 2019086553 A1 | 5/2019 | |
| WO | WO-2021040833 A1 * | 3/2021 | ......... H04L 63/0428 |

OTHER PUBLICATIONS

Extended European search report for corresponding European Patent Application No. 22846404.6, dated Mar. 21, 2025.
English machine translation of KR101249296B1 (Mar. 27, 2013).

* cited by examiner

PUBLISHER PERMISSIONED ACTIVATION IN COOKIELESS AUTHENTICATION ENVIRONMENT

CROSS-REFERENCE TO RELATED APPLICATIONS

This application claims the benefit of U.S. provisional patent application No. 63/224,021, filed on Jul. 21, 2021. Such application is incorporated herein by reference in its entirety.

BACKGROUND OF THE INVENTION

Third-party cookies are cookies set on a web browser by a website other than the one that the user is currently accessing at the time that the cookie is set. Third-party cookies have long been used by those wishing to deliver messages or message servers in a programmatic real-time bidding environment in order to track a user's browsing activities on the Internet. By tracking this activity, the messaging party may provide targeted messages, generate virtual user profiles, or perform web analytics. Web browsers are now moving toward a "cookieless" environment, however, where third-party cookies are or will soon be no longer available.

Systems are now being fielded that give web content publishers the means to identify or authenticate their readers in a cookieless environment. These systems overcome the loss of cookies for purposes of identification, but must nevertheless ensure the privacy of personal information about the web publisher's readers. Privacy protection presents new challenges in a cookieless environment. Systems and methods to improve the protection of reader privacy in such an environment is therefore desired.

References mentioned in this background section are not admitted to be prior art with respect to the present invention.

BRIEF SUMMARY OF THE INVENTION

The present invention is directed to a system that enables a publisher to specify access to people-based identifiers in a cookieless authentication environment. By giving the publisher the ability to grant access to these identifiers only to trusted parties, data "leakage" (i.e., the improper or unintentional use of personal information) is greatly reduced. Permission is controlled by encrypting the same identifiers using one of a plurality of keys, so that only those parties to whom the publisher desires to give access associated with a particular key may access the information.

In a particular embodiment, an application programming interface (API) operated by a resolution vendor accepts publisher identifiers and, after resolution of those identifiers into persons, returns "envelope" data structures that contain encrypted identifiers for persons. A "sidecar" process handles decryption and re-encryption of the envelopes as needed to support the identification environment. For example, the sidecar decrypts envelopes into identifiers usable by demand-side platforms in a real-time bidding programmatic environment.

By allowing for the dynamic association of envelope keys to individual publisher API keys, the publisher is given control over which particular downstream parties will be able to access the keys. This avoids prior art problems with "universal" identifiers that suffer from permissioning and data leakage concerns. This also is more flexible than solutions that include only a single global level of encryption, which denies the publisher control over which parties have access. Finally, in certain embodiments the control layer is further "upstream" in the real-time bidding programmatic ecosystem, which allows for more sophisticated controls and business logic than prior art identification systems that only encrypt or decrypt at the extreme edges of the real-time bidding functionality.

These and other features, objects and advantages of the present invention will become better understood from a consideration of the following detailed description of the preferred embodiments and appended claims in conjunction with the drawings as described following:

DETAILED DESCRIPTION OF THE PREFERRED EMBODIMENT(S)

Before the present invention is described in further detail, it should be understood that the invention is not limited to the particular embodiments described, and that the terms used in describing the particular embodiments are for the purpose of describing those particular embodiments only, and are not intended to be limiting, since the scope of the present invention will be limited only by the claims.

Figure 1:
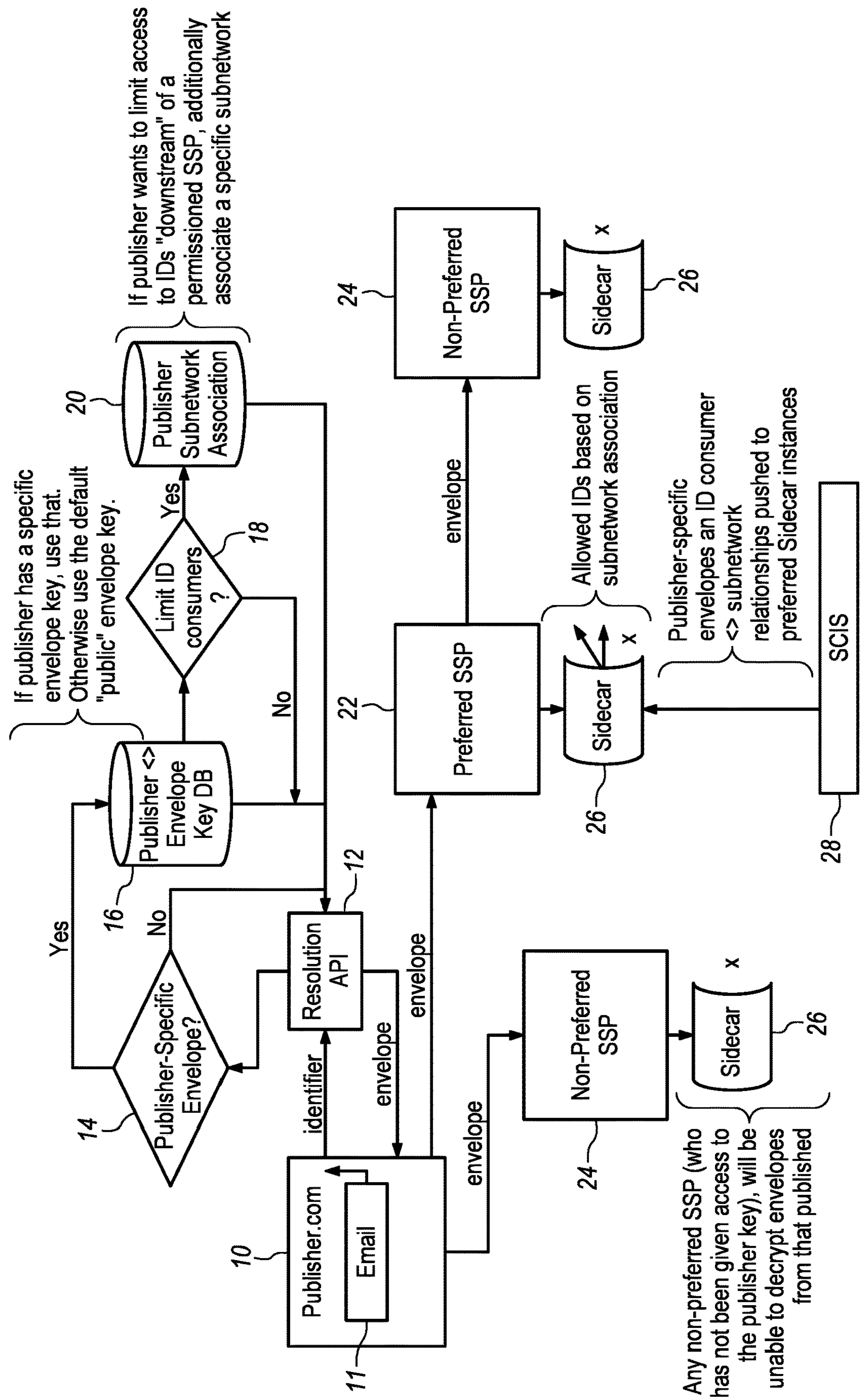
FIG. 1 is a flow diagram illustrating a method according to an embodiment of the present invention.

A method according to an embodiment of the present invention may now be described with reference to FIG. 1. Publisher 10 may be any website that provides content desired by users in the form of a publisher digital property. A publisher digital property may be any discrete digital asset that contains content deemed desirable by the user, including without limitation news, entertainment, and social media, and may include textual, audio, photographic, or video content. Publisher 10 wishes to generate revenue from its content creation by the placement of paid messages on its website, such as by the placement of banner messages, embedded messages, and the like.

In order to generate more revenue from these messages, publisher 10 desires that the messages placed on its website be relevant to its readers interests or purchasing habits, thereby increasing the likelihood that the viewing of these messages will lead to a response and eventually a sale. Thus publisher 10 may collect information from its readers, such as by asking for an email, mobile telephone number, or other identifier in order to send the reader offers, and/or to log in to view some or all content available at the website of publisher 10. Email 11 is used in the embodiment of FIG. 1. The email 11, mobile telephone number, or other information provided by the reader may be used as an identifier. For privacy reasons, however, this identifier is encrypted before it is used in the process described herein. The identifier may, for example, be hashed before further processing occurs, as one method of encryption.

Once the identifier is collected, it is sent to the resolution vendor API 12. In a manner invisible to publisher 10, the resolution services vendor providing API 12 responds to an API call containing the identifier with an "envelope" data structure that contains an encrypted identifier corresponding to the unencrypted identifier and potentially other data or metadata. The purpose of API 12 is to provide a front end to a system that is able to use the hashed identifier in order to positively, pseudonymously identify the person to whom the identifier belongs, and return an encrypted identity "envelope" (as described below) to the publisher. This process is performed using the resolution vendor's identity graph.

An identity graph is a data structure that contains nodes for a large collection of objects, such as consumers in a geographic or geopolitical region. Nodes correspond to touchpoints for such objects, and edges in the graph connect nodes that correspond to the same object. By searching the identity graph for the hashed identifier, the corresponding object (e.g., consumer) may be identified. A link is an identifier that is uniquely associated with a particular object from within a universe of such objects, such as, for example, all persons in a particular geographic or geopolitical region. The link may be of any form, including, for example, a number or alphanumeric identifier. One such service providing these sorts of links is the RampID service provided by LiveRamp, Inc. of San Francisco, California. The RampID is a link that uniquely and persistently is associated with a particular person, business, or household. It may be seen then that an identifier input by publisher 10 is transformed to an encrypted identifier that is included in the envelope. The envelope is an encrypted container which contains one or more encrypted links along with relevant metadata.

Once the envelope is returned, publisher 10 may then set a first-party cookie or local storage object on that reader's browser. This first-party cookie contains the envelope. It should be noted that since this cookie is set by publisher 10, it is—from the perspective of the reader's browser—being provided by the website being viewed, not by a third party. The system thus can operate in an environment or on a browser even where third-party cookies are blocked because the envelope is in fact a first-party cookie, not a third-party cookie.

At step 14, the resolution services vendor determines whether a publisher-specific envelope (with a publisher-specific encrypted identifier) is desired in this instance. If not, then the system operates in a normal fashion and returns the envelope with standard encryption and permissions through resolution API 12, which is passed back to publisher 10. Otherwise, processing moves to publisher-envelope key database 16. Note that if the publisher desires a publisher-specific envelope, then the publisher will need to provide the publisher-specific envelope key in the API call at resolution API 12. Publisher-envelope key database 16 provides a look-up function to allow matching of the publisher-specific envelope key against a database of links maintained by the resolution services vendor.

At step 18, the resolution services vendor further determines (based on information that was provided during the resolution API 12 call) whether the publisher wants to further limit access to identifiers downstream of a permissioned demand-side platform (DSP) or another recipient. In a programmatic real-time bidding environment, a DSP is a system that allows buyers of digital messaging inventory to manage bids for the right of placing their messaging at various publishers. In this case, publisher subnetwork association database 20 may be used to apply an additional association between the particular encrypted reader identifiers and a specific subnetwork.

At some time after setting the first-party cookie, the envelope is read from the user's browser, and is passed to a supply-side platform (SSP). The SSP may be a preferred SSP 22 or a non-preferred SSP 24 in this system. An SSP is a messaging exchange, contracted by the publisher, used to programmatically sell messaging space in an automated fashion within a programmatic environment. The SSP implements a service provider "sidecar" 26, as shown in FIG. 1. Sidecar 26 is a subsystem for managing the secure decryption and decoding of identifiers used in real-time bidding programmatic systems. It generates platform-encoded links (such as RampID identifiers) at a speed that makes the system workable in a real-time bidding programmatic environment. This speed is important, since failure to provide the platform-encoded links in a sufficiently small timeframe would make the system unworkable, as users would experience too much delay in order for publisher websites to be usable.

Sidecar 26 may include permissioning functionality by managing links, periodically checking for updates to encoding information, and may periodically report telemetry information. Sidecar 26 generates identifiers for use by downstream platforms, such as DSPs (as further described below with reference to FIG. 2). A DSP is similar to an SSP in function, as noted above, but is used on the marketing (i.e., the "demand" side) to buy messaging impressions from exchanges in an automated real-time bidding fashion. The DSP identifiers are each encrypted as described above. Once the encrypted identifiers are passed out to the various DSPs, then programmatic and real-time bidding for publisher inventory to those wishing to send messages or their agencies may proceed in a normal manner without the need for third-party cookies or device identifiers.

Once publisher 10 has the envelope it needs back from resolution API 12 as just described, it may then send that envelope to a "preferred" (i.e., trusted) SSP 22 or non-preferred SSP 24. It may be seen, however, that only the preferred SSP 22 will be able to decrypt the envelope using sidecar 26. The purpose of sidecar 26 is to quickly and efficiently provide encryption/decryption services for the envelopes in a secure environment. Sidecar 26 will, however, be unable to decrypt envelopes from a publisher that has designated an SSP as a non-preferred SSP 24. On the other hand, sidecar 26 may provide decryption for identifiers for preferred SSP 22, optionally using subnetwork association as well. Publisher-specific envelopes and identifier consumer-subnetwork relationships are pushed to preferred sidecar instances at Sidecar Check In Service (SCIS) 28. As shown in FIG. 1, preferred SSP 22 may pass envelopes to a non-preferred SSP 24, but non-preferred SSP 24 still will be unable to decrypt and use those identifiers using sidecar 26. Thus this process prevents surreptitious use of identifiers by non-preferred SSP 24 against the desires of publisher 10.

Figure 2:
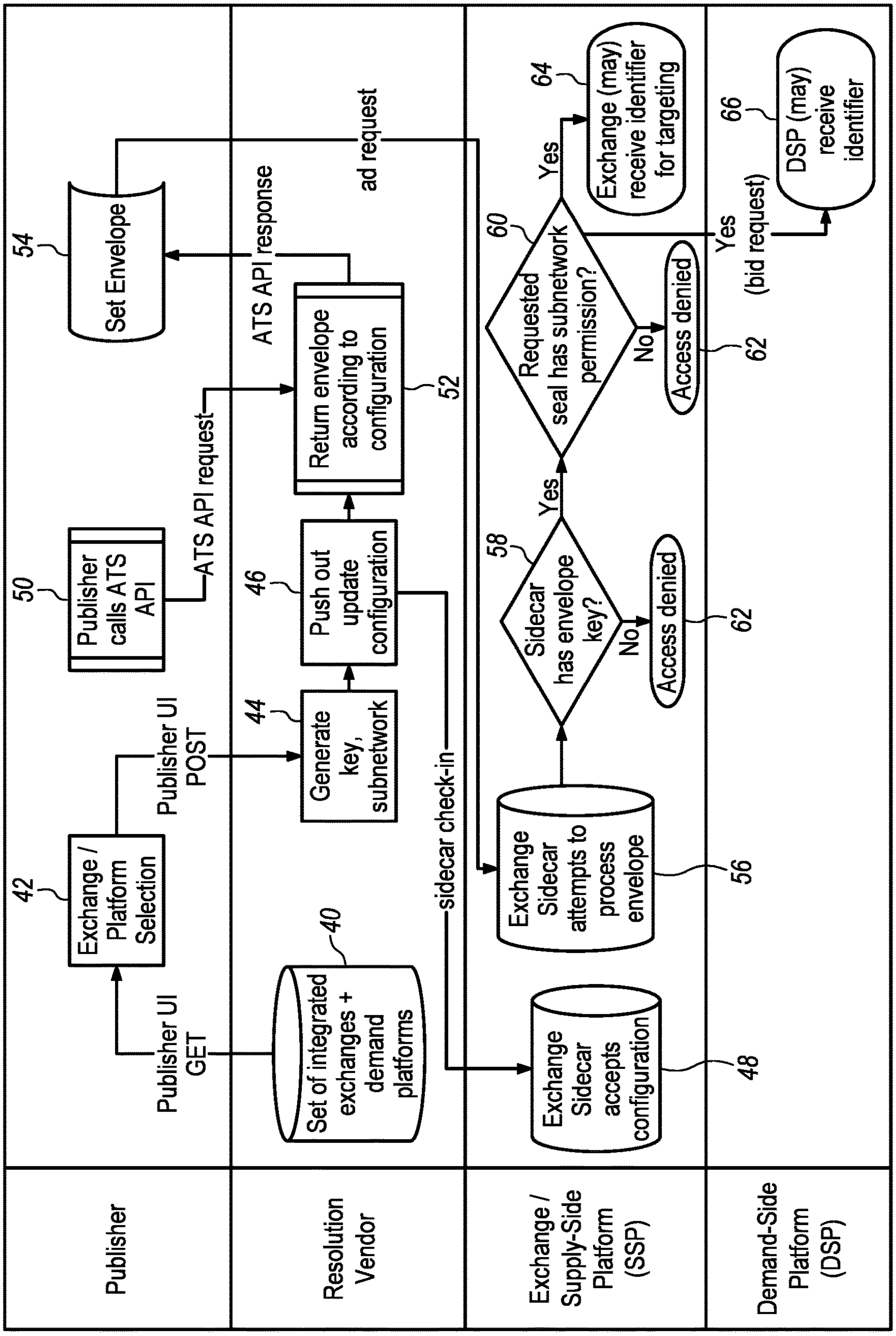
FIG. 2 is a swim lane diagram illustrating the method of FIG. 1 in a broader programmatic environment.

With reference now to the swim lane chart of FIG. 2, an embodiment of the invention may be described in the greater context of a programmatic real-time bidding environment. This ecosystem includes the publisher and resolution vendor, as well as one or more exchange/supply-side platforms (SSPs) and demand-side platforms (DSPs). Processing may begin at the resolution vendor, which maintains a platform database 40. Platform database 40 comprises a set of addresses for integrated messaging exchanges/supply-side platforms and demand-side platforms that may be used in the real-time bidding programmatic ecosystem. The publisher executes a demand to retrieve information from platform database 40, such as by an HTTP "GET" command through a publisher user interface (UI). The publisher then selects an exchange or DSP at platform selection step 42. This information is passed back to the resolution vendor, such as through an HTTP "POST" command.

The resolution vendor receives the exchange or DSP selection and generates a key and associated subnetwork as desired by the publisher at step 44. The resolution vendor then pushes out an updated configuration at step 44. The SSP accepts this configuration at the accept configuration step 48. The publisher makes an API call to the API maintained by the resolution vendor for the purpose of generating envelopes at step 50. The resolution vendor's sidecar creates a responsive envelope based on the configuration at step 52, and the envelope is sent to the publisher in an API call response at step 54. At this point, the publisher has the envelope with the appropriately encrypted identifier and the associated data or metadata included in the envelope with this particular configuration of the system.

Once the publisher has the envelope, a message request is sent to the exchange/SSP and at step 56 the exchange sidecar attempts to process the envelope. At decision block 58, the exchange/SSP determines whether the sidecar has the corresponding link, or key. If not, then access is denied and processing stops at step 62. If so, then at decision block 60 it is determined if the appropriate permission has been given. If not, then access is denied and processing stops at step 62. Otherwise, the exchange may receive the identifier for targeting at step 64. In addition, if a bid request is received from the demand side in the real-time bidding environment, then the DSP may also receive the identifier at step 66.

Figure 3:
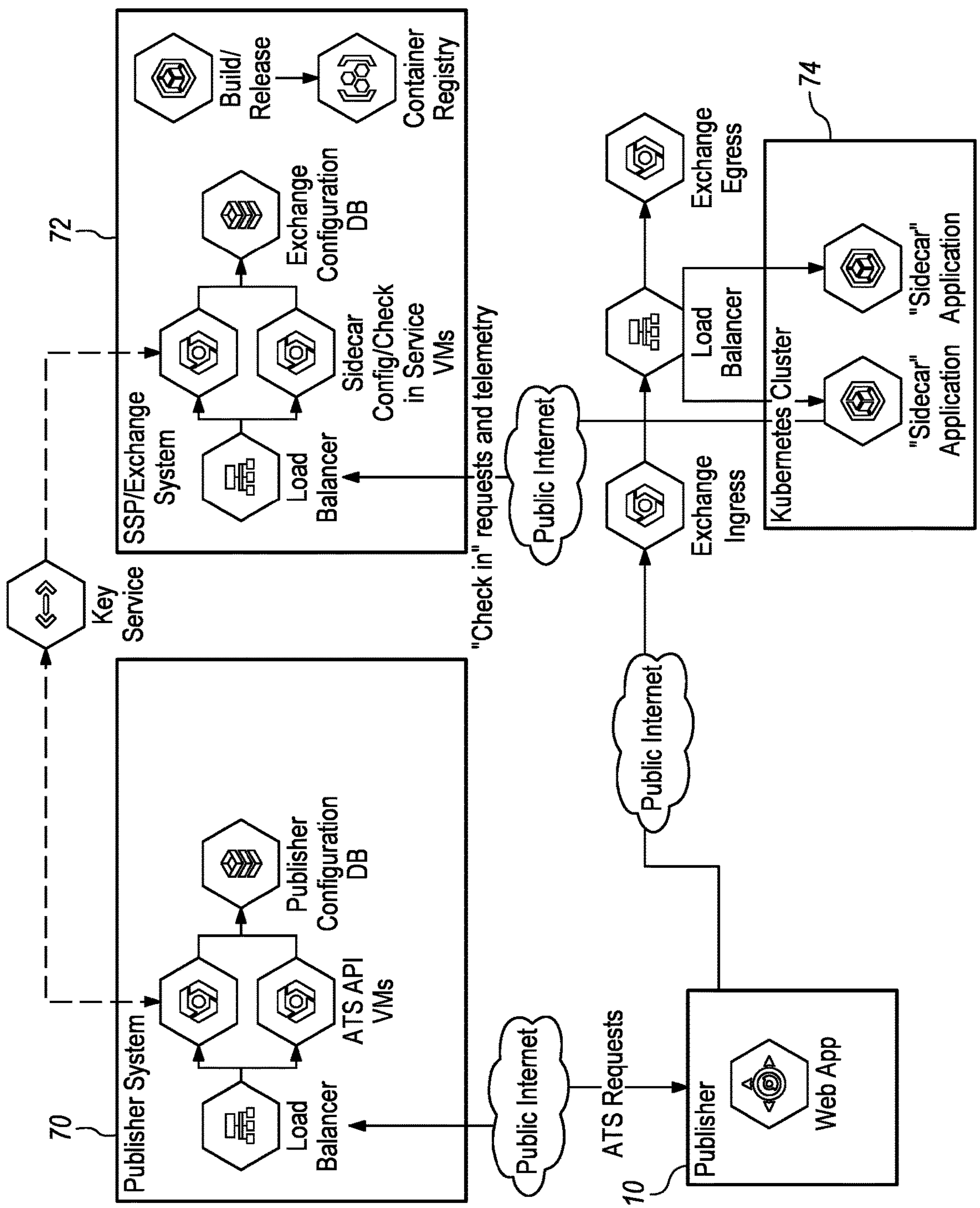
FIG. 3 is a hardware diagram illustrating a system for implementing the method of FIGS. 1 and 2.

FIG. 3 provides an overview of a hardware configuration to implement the publisher, resolution vendor, and exchange/SSP components of a system according to certain embodiments of the present invention. These components include publisher system 70, SSP 72, publisher system 10 as described above, and sidecar system 74. It should be noted that in order to operate in the real-time bidding requirement, processing must take place at great speed; otherwise, the resulting delay in setting messages on user web pages at the publisher site would be too great for the system to function effectively. In order to operate the sidecar, an exchange must have, in certain embodiments, one or more central processing unit cores operating at a base frequency of 2 GHz or more, 300 MB or RAM or more available, networking capabilities, support for x86 or ARM instruction sets, and sufficient disk space.

It should be noted that in alternative embodiments of the invention, different encryption methods could be applied (e.g., asymmetric rather than symmetric). Information other than a subnetwork could be used to permission downstream usage. An application other than a sidecar could handle the processing. Data sharing could occur beyond the real-time bidding/messaging workflow.

The present invention, in the various process implementations as described herein, offer a number of advantages. Because of the speed at which the process operates and the fact that it functions in real time, it has no user-noticeable delay, and thus has no impact to the user experience at a publisher website. In various implementations the invention avoids problems with third-party cookies by writing envelopes to persistent first-party storage associated with the user browser, such as in a flash memory or hard drive. In certain configurations, the invention is easily interfaced with adapters used in the real-time bidding programmatic ecosystem (e.g. prebid.js), and also may easily interface with various third-party systems, such as the Privacy Manager JavaScript API for the consent management platform (CMP) from LiveRamp, Inc. of San Francisco, California. Further, in certain embodiments the invention may present a customizable modal to request the user's email, mobile phone number, or other personal information and can be configured by passing a configuration object at runtime.

Although the invention has been described with respect to applications where cookie caches are used for storing the link envelope, the invention is not so limited. In other implementations, the invention may be applied in channels where hardware device identifiers are available to the publisher, such as is presently the case with respect to mobile devices including smartphones. The invention in other implementations may also be applied in channels where device identity does not exist at all or is imperfect, such as an Internet Protocol (IP) address on an addressable television or television set-top box.

A more detailed description of software components of implementations of the present invention may now be provided. In an embodiment, the invention is implemented as a client-side solution for publishers that detects email entries at a website, including but not limited to log-in interactions and offers to send updates to a user by email or text. The publisher uses the JavaScript library provided as part of the solution, and is required to instantiate it with a configuration object so that the provider may recognize the instantiation. It may be included in the source HTML header as a self-hosted JavaScript file or served directly. With the library name as ats.js, a self-hosted script could look like this: <script src="/public/javascript/ats.js"></script>. This may be included just before the closing </body> tag to ensure that the page is fully rendered and ready for user interaction. In the case of high-latency pages, ats.js may be added to the <head>. To start the library, a script tag as presented below may be used:

```
<script>
var atsScript = document.createElement('script');
atsScript.onload = function( ) {
  window.ats.start({
    "placementID": REPLACE_ME,
    "storageType": "localStorage",
    "detectionType": "scrape",
    "cssSelectors": [
      "input[type=text]",
      "input[type=email]"
    ],
    "logging": "error"
  });
};
atsScript.src = 'https://ats.rlcdn.com/ats.js';
document.body.appendChild(atsScript);
</script>
```

The library will manage detection (unless an identifier is directly passed), identity resolution, and persistence. Demand partners are then able to retrieve the link envelope from its storage location, either via a direct JavaScript call or through a prebid.js userID module. The publisher is provided with a JavaScript library and documentation information in order to implement the solution from the publisher side. Specifically, the publisher pulls down the ats.js library and the standard prebid.js core library, along with proprietary pre-bid adapters that support identity envelopes. This system, once installed, receives an email address (or, in alternative embodiments, other identifiers) as an input from the user through the publisher site. Suppose now that a user accesses the publisher website for desired news or other publisher content. The user navigates to the appropriate webpage using the Safari browser on his or her Phone device, in this example. The user is presented with a request to allow data sharing, and responds affirmatively. The user then is presented with the desired content. After reading, a modal slides down across the screen, asking the user for his or her email address in order to receive content updates directly in his or her email inbox. The user, who desires these updates, agrees and returns to the publisher home page. The publisher user then employs the identity envelopes in a general programmatic real-time bidding solution.

The resolution vendor provides publishers with a code that is placed in the header of the publisher's website. When a user's identity is provided to the site, the API translates personal information (such as email, etc.) to an identity token (an envelope containing a link) and stores it in a first-party cookie context on the user's browser as previously explained. Upon page load or subsequent page visit, the header bidder reads the link in the envelope from the first-party cookie and passes this to SSPs. Each SSP then passes the link envelope to the provider's sidecar to translate to the DSP the identifiers. The identifiers are passed to the DSPs in the programmatic real-time bid request, with other information about the inventory. The DSP is then able to make optimally informed bids with a link tied to both first-party and third-party data.

As may be seen, the system and method provides a JavaScript library that publishers may readily incorporate into their properties. While the code should not execute until consent has been properly collected as required by applicable law, the code should execute as soon as the page can be interacted with by the user. The library may reference a common set of cascading style sheets (CSS) selectors that relate to "typical" locations of identifiers. For example, input[type=text]. A publisher may incorporate additional CSS selectors, either in the library file itself or in an additional selector-only file. Using configured CSS selectors, the system may watch for any interesting "submit" events that contain valid email addresses as defined by a typical email regular expression (regex), e.g., /^[a-zA-Z0-9.!#$%&'*+/=?^_'{|}~-]+@[a-zA-Z0-9-]+(?:\.[a-zA-Z0-9-]+)*$/. Upon recognition of a valid email submission event, the email is hashed (such as using the SHA1 algorithm) and a network call is made to an API from the resolution vendor that will accept the hash and return an envelope in a JSON payload, such as this:

{"envelope":"AhT2iHFFSriRpMW1oRuKYGcT0DJiLzpyAr3z4SnsCWa4-ae2DqE8ru2fdZjmtLC0Tb8-3g"}.

The envelope is then written into client-side, first-party storage along with a timestamp at which the value was written or updated. The prebid.js adapters take over at this point, reading the envelope and making it available with the message exchanges in the programmatic real-time bidding ecosystem.

Configuration options allow the publisher to instruct how and when to transform personal information into secure, encrypted link envelopes. A placementID should be used in a configuration object, in order to identify to the provider the particular instantiation of the solution and associate that with a particular publisher. The ats.js has two basic modes of operation: direct and detect. In direct mode, the publisher provides the identifier directly to the ATS library. If the publisher already has user login information, the publisher may ensure that it is usable by demand by including it directly in its configuration. If the publisher knows that users will provide an identifier on the property, but isn't able to provide it supply-side (such as, for example, if there is a newsletter signup provided by a Marketo or Mailchimp widget), then the provider can use DOM or URL-driven detection methods. Using direct, the publisher may pass plaintext email addresses as follows (the provider here being LiveRamp, Inc.):

```
{
  "placementID": 9999,
  "email": "imeyers@liveramp.com"}
Otherwise, one or more email hashes can be passed as follows:
{
  "placementID": 9999,
  "emailHashes": [
"b364fe946d9982c6c547d5637645f9c3dd60ca2aa174e551718509d5d
ee66ab7",   "b2c0928035d5f521a880381dc7ec85df7b7e06b3"
     "4466aba660dd65e279fb8700f7ff1cb9"
  ]
}
```

In a preferred embodiment, the publisher passes either a plaintext email address or multiple hash types to the resolution vendor in order to ensure the best possible identity resolution (and therefore matches to users that the parties creating messages wish to reach). Before the email hashes are passed, the publisher should preferably ensure that the emails are validated against a regular expression, remove whitespaces, and downcase all letters in the address. If detect is used, then the solution can be configured to accept one or more standard CSS selectors that instruct it where to watch for identifiers, as follows:

```
{
  "placementID": 9999,
  "cssSelectors: [
  "newsletterSignup"
  ]
}
```

Alternatively, the publisher can instruct the solution to watch for an identifier in a URL parameter. For example, if a user clocks through email notifications and lands on https://example.com/alerts?email_trigger-imeyers@liveramp.com, then the publisher can configure the solution to check values in the email_trigger parameter. The URL value should be passed under the detectiontype attribute. URL detection may be as follows:

```
{
  "placementID": 9999,
  "detectionType": "url",
  "urlParameter": "email_trigger"
}
```

In addition, there are a number of advanced configuration options that are expected to be used less commonly. By default, the envelope (along with a generation timestamp and version information) is written to a first-party cookie. The publisher can alternatively instruct the solution to write into a local storage object by changing the storageType attribute:

```
{
  "placementID": 9999,
  "storageType": "localStorage", "cssSelectors": [
    "input[type=email]"
  ]
}
```

If the publisher wishes to run ATS on specific browsers, those may be identified in the browsers attribute, as follows:

```
{
  "placementID": 9999, "cssSelectors": [
    "#newsletterSignup" ],
  "browsers": [
    "safari"
  ]
}
```

By default, the solution runs utilizing the library that is first loaded. Alternatively, a detection interval may be specified. This is useful, for example, if the publisher expects an asynchronous process to populate the user's email address in a DOM element. An example for detection every ten seconds may be as follows:

```
{
  "placementID": 9999,
  "cssSelectors": [
  ],
  "detectionInterval: 10000
}
```

If it is desired to limit the pages on which the solution will attempt to run, urlRegex may be used in the configuration:

```
{
  "placementID": 9999, "cssSelectors": [
    "input[type=email]" ],
  "urlRegex": "login"
}
```

By default, the solution does not log any library events, but it may be useful to view more verbose logs, especially during development:

```
{
  "placementID": 9999, "cssSelectors": [
    "#newsletterSignup" ],
  "logging": "debug"
}
```

Other potential values are ["info", "warn", "error" ].

Typically, the only ats.js function that will be called is ats.start(config);. This function should be placed into its own HTML <script> tag and called with the publisher's configuration object just after the <script> tag for ats.js. Other possible function calls may be ats.retrieveEnvelope(callback);, which fetches an envelope from configured storage, with the callback function being optional. If the function is called without a callback, a promise will be returned. If the function is called with callback, an envelope value will be returned. Another possible function is ats.triggerDetection( );. This function will scan for DOM elements with the CSS selectors specified in the publisher's configuration.

In certain implementations, the pre-existing, open source prebid.js is used with ats.js, as ats.js is optimized to plug into prebid.js. Once a properly configured prebid.js file is loaded, the publisher should update pbjs.setConfig to pass the required information to the link user ID module. A configuration for prebid.js is shown below:

```
pbjs.setConfig({
  userSync: {
    userIds: [{
      name: 'identityLink',
      params: {
        pid: '9999' // Set your real identityLink placement ID here
},
      storage: {
        type: 'cookie',
        name: 'idl_env',
        expires: 1
      }
    }],
    syncDelay: 5000
  }
```

For the API underlying the JavaScript library accessed directly, the query parameters for the API call include the pid (partner ID number); it (identifier type of email, i.e., hashed email, hashed phone number, etc.); iv (a hash of the raw email); ct (indicating the type of consent passed to the API, e.g., whether or not it is a TCF v.1.1 or v2 compatible consent string as required under the GDPR); and cv (the relevant consent string value). Hashing methods may include MD5, SHA1, and SHA256, as examples. Preferably, all spaces, tabs, and other empty characters are removed from the plaintext email before processing, and capital letters are all converted to lowercase. "Fake" emails are identified and dropped. For phone numbers, formatting should preferably be removed before processing. The response from the API call if successful with be a JSON object with a simple key/value containing the identity envelope, such as {"envelope":"Ao42jiiUNWfvloyXY887EBn801otRTWYnklvjCtw9REF_T MoMWLkeUvzVmQVZG1q"}.

If the user is opted out, then there will be a different response code with no content.

Although in the implementations described above the invention does not require the use of third-party cookies, in alternative implementations such functionality can be provided. In order to enhance addressability, for example, alternative implementations may support dropping a standard image match pixel. In this case, the publisher requests a pixel identifier from the service provider. Once the pixel identifier is obtained, this may be provided into the ats.js configuration with example code provided below:

```
{
  "placementID": 9999,
```

-continued

```
            "cssSelectors": [
              "input[type=text]"
            ],
            "pixelID": 12345
          }
```

This code will drop a script tag just before the closing </body> tag and attempt to set a service provider third-party cookie in a conventional manner.

In certain implementations, the invention may be integrated with social media log-in information. Social log-ins can be powerful tools to register users with minimal friction and high confidence in the validity of the provided information. For example, consider the case where integration is desired with the Facebook platform. The publisher is likely using the Facebook JavaScript SDK, which allows the publisher to obtain user emails from Facebook APIs for use with ats.js. The publisher may implement a "log in with Facebook" button, using html code as in the following example:

```
  <a onclock-"onLogin( )">Login with Facebook</a>
In that case, the JavaScript code for the onLogin function might be as
follows:
  function onLogin( ) {
    FB.login(function(response) {
      if (response.authResponse) {
        window.FB.api('/me?fields=email',
function(response) {
          callATS(response.email);
        });
      } else {
        console.log('not logged in...');
      }
    }, {scope: 'email'})
  }
```

As another example, consider a publisher using Google sign in to authenticate users. In this case, the publisher may need only to modify its onSignIn function to call the provider's system using the user's email address, as shown in the exemplary JavaScript code that follows:

```
function onSignIn(googleUser) {
  var profile = googleUser.getBasicProfile( );
  var email = profile.getmail( ));
  callATS(email);
}
```

In various implementations the invention may also be integrated with website tag managers, such as the Google Tag Manager. Using the Google Tag Manager as currently implemented, the publisher would first navigate to the url https://tagmanager.google.com, and then click "New Tag." The tag name "Untitled Tag" is then changed to something to identify the tag being created, such as "ATS JavaScript." The user then clicks in the Tag Configuration section, and under "Choose Tag Type" clicks "Custom HTML Tag." The exemplary HTML code below may be used, with the publisher replacing its own placement ID for the REPLACE_ME value.

```
<script>
var atsScript = document.createElement('script');
atsScript.onload = function( ) {
```

-continued

```
  window.ats.start({
    "placementID": REPLACE_ME,
    "storageType": "localStorage",
    "detectionType": "scrape",
    "cssSelectors": [
      "input[type=text]",
      "input[type=email]"
    ],
    "logging": "error"
  });
};
atsScript.src = 'https://ats.rlcdn.com/ats.js';
document.body.appendChild(atsScript);
</script>
```

The publisher then clicks into "Triggering" and selects the trigger it would like to connect the ats.js execution to. In one example, the trigger can be configured to fire on all pages. The publisher then saves changes, clicks "Submit," and then "Publisher," optionally adding a version change note.

In certain implementations, the invention may support the use of a custom identifier (custom ID) instead of typical identifiers such as hashed email addresses and telephone numbers. A mapping file may be sent to the service provider in order to implement this functionality. In an example, the file should contain the publisher company name, the type of upload and the current date in ISO 8601 format separated by underscores. An example would be "IansCompany_AKP_2020-03-01.tsv". The contents of the file in this example are two tab-separated columns, titled "CID" and "Email Address." The first column contains the userIDs that the publisher will input to the ats.js system. The second column contains a SHA-256 hashed email address. The email address should be downcases and whitespace removed prior to hashing to ensure an accurate result. The file may be sent to the provider over SFTP.

Once the provider has confirmed successful ingestion of the publisher's first mapping file, the publisher will then configure ats.js for the newly-created custom identifier. The provider will provide the publisher with an accountID, which is to be included in the configuration. A regular expression should also be included for the identifier in customerIDRegex. The regular expression enables ats.js to validate that identifiers match an expected pattern. Similar to using ats.js with raw identifiers, the publisher can either pass the identifier directly in the configuration (as the customerID) parameter, or let ats.js operate in detect mode. If detection is used, then the publisher should ensure that "detectionSubject": "customerIdentifier" is passed alongside any other required attributes such as detectionType. A sample configuration custom ID detection follows:

```
{
  "logging": "debug",
  "placementID": 9999,
  "detectionType": "url",
  "urlParameter": "customerid"
  "detectionSubject": "customerIdentifier",
  "customerIDRegex": "[0-9a-f]{32}\Z",
  "accountID": "123456",
  "customerID": "0d755934-693e-42c7-b04a-761a9c82df60"
}
```

A sample configuration for custom ID direct operation follows:

```
{
  "logging": "debug",
  "placementID": 9999,
  "customerIDRegex": "[0-9a-f]{32}\Z",
  "accountID": "123456",
  "customerID": "0d755934-693e-42c7-b04a-761a9c82df60"
}
```

In certain implementations, the invention may have the ability to accept emails passed in the URL from an email newsletter product. Generally speaking, it is preferable to leverage direct logins from users, because that approach provides the best transparency into what data is being processed on the users' behalf and also ensures that the publisher has the correct identity, as emails can be forwarded to individuals other than the original recipient. But utilizing emails from an email newsletter product may, however, be useful for publishers who already have a large pool of identifier users in their email service provider (ESP). To enable ats.js to leverage these identifiers, the publisher should modify its standard newsletters or transactional emails to pass an identifier when users click through to visit the site. The publisher will either add a new link (or modify an existing link) to add an additional query parameter and then add [email] to represent a dynamically-populated representation of the user's email address. One example URL could be: https://authenticated-traffic-solution.com?user_id=[email]. Next, the publisher configures ats.js to detect and resolve email addresses passed through its campaign monitor. The example JavaScript below may be used, modified to use the publisher's actual placement ID and the query parameter used when setting up the link:

```
{
  "placementID": 9999,
  "storageType": "localStorage",
  "detectionType": "url",
  "detectionSubject": "email",
  "logging": error",
  "urlParameter": "user_id"
}
```

In the specific example where mailchimp is used for email campaigns, the additional query parameter adds *|EMAIL|* to represent a dynamically-populated representation of the user's email address: An example url would be: https://authenticated-traffic-solution.com?user_id=*|email|*. The publisher would then click "insert" to update the link. In previews, the publisher will see the email macro populated with <<Test Email Address>>. In production, this field will be populated with the recipient's email. The publisher then configures ats.js to detect and resolve the email addresses passed through mailchimp; the example configuration below may be used:

```
{
  "placementID": 9999,
  "storageType": "localStorage",
  "detectionType": "url",
  "detectionSubject": "email",
  "logging": error",
  "urlParameter": "user_id"
}
```

The systems and methods described herein may in various embodiments be implemented by any combination of hardware and software. For example, in one embodiment, the systems and methods may be implemented by a computer system or a collection of computer systems, each of which includes one or more processors executing program instructions stored on a computer-readable storage medium coupled to the processors. The program instructions may implement the functionality described herein. The various systems and displays as illustrated in the figures and described herein represent example implementations. The order of any method may be changed, and various elements may be added, modified, or omitted.

A computing system or computing device as described herein may implement a hardware portion of a cloud computing system or non-cloud computing system, as forming parts of the various implementations of the present invention. The computer system may be any of various types of devices, including, but not limited to, a commodity server, personal computer system, desktop computer, laptop or notebook computer, mainframe computer system, handheld computer, workstation, network computer, a consumer device, application server, storage device, telephone, mobile telephone, or in general any type of computing node, compute node, compute device, and/or computing device. The computing system includes one or more processors (any of which may include multiple processing cores, which may be single or multi-threaded) coupled to a system memory via an input/output (I/O) interface. The computer system further may include a network interface coupled to the I/O interface.

In various embodiments, the computer system may be a single processor system including one processor, or a multiprocessor system including multiple processors. The processors may be any suitable processors capable of executing computing instructions. For example, in various embodiments, they may be general-purpose or embedded processors implementing any of a variety of instruction set architectures. In multiprocessor systems, each of the processors may commonly, but not necessarily, implement the same instruction set. The computer system also includes one or more network communication devices (e.g., a network interface) for communicating with other systems and/or components over a communications network, such as a local area network, wide area network, or the Internet. For example, a client application executing on the computing device may use a network interface to communicate with a server application executing on a single server or on a cluster of servers that implement one or more of the components of the systems described herein in a cloud computing or non-cloud computing environment as implemented in various subsystems. In another example, an instance of a server application executing on a computer system may use a network interface to communicate with other instances of an application that may be implemented on other computer systems.

The computing device also includes one or more persistent storage devices and/or one or more I/O devices. In various embodiments, the persistent storage devices may correspond to disk drives, tape drives, solid state memory, other mass storage devices, or any other persistent storage devices. The computer system (or a distributed application or operating system operating thereon) may store instructions and/or data in persistent storage devices, as desired, and may retrieve the stored instruction and/or data as needed. For example, in some embodiments, the computer system may implement one or more nodes of a control plane or control system, and persistent storage may include the SSDs attached to that server node. Multiple computer systems may share the same persistent storage devices or may share a pool of persistent storage devices, with the devices in the pool representing the same or different storage technologies.

The computer system includes one or more system memories that may store code/instructions and data accessible by the processor(s). The system memory may include multiple levels of memory and memory caches in a system designed to swap information in memories based on access speed, for example. The interleaving and swapping may extend to persistent storage in a virtual memory implementation. The technologies used to implement the memories may include, by way of example, static random-access memory (RAM), dynamic RAM, read-only memory (ROM), non-volatile memory, or flash-type memory. As with persistent storage, multiple computer systems may share the same system memories or may share a pool of system memories. System memory or memories may contain program instructions that are executable by the processor(s) to implement the routines described herein. In various embodiments, program instructions may be encoded in binary, Assembly language, any interpreted language such as Java, compiled languages such as C/C++, or in any combination thereof; the particular languages given here are only examples. In some embodiments, program instructions may implement multiple separate clients, server nodes, and/or other components.

In some implementations, program instructions may include instructions executable to implement an operating system (not shown), which may be any of various operating systems, such as UNIX, LINUX, Solaris™ MacOS™, or Microsoft Windows™. Any or all of program instructions may be provided as a computer program product, or software, that may include a non-transitory computer-readable storage medium having stored thereon instructions, which may be used to program a computer system (or other electronic devices) to perform a process according to various implementations. A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/CD-ROM coupled to the computer system via the I/O interface. A non-transitory computer-readable storage medium may also include any volatile or non-volatile media such as RAM or ROM that may be included in some embodiments of the computer system as system memory or another type of memory. In other implementations, program instructions may be communicated using optical, acoustical or other form of propagated signal (e.g., carrier waves, infrared signals, digital signals, etc.) conveyed via a communication medium such as a network and/or a wired or wireless link, such as may be implemented via a network interface. A network interface may be used to interface with other devices, which may include other computer systems or any type of external electronic device. In general, system memory, persistent storage, and/or remote storage accessible on other devices through a network may store data blocks, replicas of data blocks, metadata associated with data blocks and/or their state, database configuration information, and/or any other information usable in implementing the routines described herein.

In certain implementations, the I/O interface may coordinate I/O traffic between processors, system memory, and any peripheral devices in the system, including through a network interface or other peripheral interfaces. In some embodiments, the I/O interface may perform any necessary protocol, timing or other data transformations to convert data signals from one component (e.g., system memory) into a format suitable for use by another component (e.g., processors). In some embodiments, the I/O interface may include support for devices attached through various types of peripheral buses, such as a variant of the Peripheral Component Interconnect (PCI) bus standard or the Universal Serial Bus (USB) standard, for example. Also, in some embodiments, some or all of the functionality of the I/O interface, such as an interface to system memory, may be incorporated directly into the processor(s).

A network interface may allow data to be exchanged between a computer system and other devices attached to a network, such as other computer systems (which may implement one or more storage system server nodes, primary nodes, read-only node nodes, and/or clients of the database systems described herein), for example. In addition, the I/O interface may allow communication between the computer system and various I/O devices and/or remote storage. Input/output devices may, in some embodiments, include one or more display terminals, keyboards, keypads, touchpads, scanning devices, voice or optical recognition devices, or any other devices suitable for entering or retrieving data by one or more computer systems. These may connect directly to a particular computer system or generally connect to multiple computer systems in a cloud computing environment, grid computing environment, or other system involving multiple computer systems. Multiple input/output devices may be present in communication with the computer system or may be distributed on various nodes of a distributed system that includes the computer system. The user interfaces described herein may be visible to a user using various types of display screens, which may include CRT displays, LCD displays, LED displays, and other display technologies. In some implementations, the inputs may be received through the displays using touchscreen technologies, and in other implementations the inputs may be received through a keyboard, mouse, touchpad, or other input technologies, or any combination of these technologies.

In some embodiments, similar input/output devices may be separate from the computer system and may interact with one or more nodes of a distributed system that includes the computer system through a wired or wireless connection, such as over a network interface. The network interface may commonly support one or more wireless networking protocols (e.g., Wi-Fi/IEEE 802.11, or another wireless networking standard). The network interface may support communication via any suitable wired or wireless general data networks, such as other types of Ethernet networks, for example. Additionally, the network interface may support communication via telecommunications/telephony networks such as analog voice networks or digital fiber communications networks, via storage area networks such as Fibre Channel SANs, or via any other suitable type of network and/or protocol.

Any of the distributed system embodiments described herein, or any of their components, may be implemented as one or more network-based services in the cloud computing environment. For example, a read-write node and/or read-only nodes within the database tier of a database system may present database services and/or other types of data storage services that employ the distributed storage systems described herein to clients as network-based services. In some embodiments, a network-based service may be implemented by a software and/or hardware system designed to support interoperable machine-to-machine interaction over a network. A web service may have an interface described in a machine-processable format, such as the Web Services Description Language (WSDL). Other systems may interact with the network-based service in a manner prescribed by the description of the network-based service's interface. For example, the network-based service may define various operations that other systems may invoke, and may define a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a network-based services request, a network-based services client may assemble a message including the request and convey the message to an addressable endpoint (e.g., a Uniform Resource Locator (URL)) corresponding to the web service, using an Internet-based application layer transfer protocol such as Hypertext Transfer Protocol (HTTP). In some embodiments, network-based services may be implemented using Representational State Transfer (REST) techniques rather than message-based techniques. For example, a network-based service implemented according to a REST technique may be invoked through parameters included within an HTTP method such as PUT, GET, or DELETE.

Unless otherwise stated, all technical and scientific terms used herein have the same meaning as commonly understood by one of ordinary skill in the art to which this invention belongs. Although any methods and materials similar or equivalent to those described herein can also be used in the practice or testing of the present invention, a limited number of the exemplary methods and materials are described herein. It will be apparent to those skilled in the art that many more modifications are possible without departing from the inventive concepts herein.

All terms used herein should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. When a grouping is used herein, all individual members of the group and all combinations and sub-combinations possible of the group are intended to be individually included in the disclosure. When a range is mentioned herein, the disclosure is specifically intended to include all points in that range and all sub-ranges within that range. All references cited herein are hereby incorporated by reference to the extent that there is no inconsistency with the disclosure of this specification.

The present invention has been described with reference to certain preferred and alternative embodiments that are intended to be exemplary only and not limiting to the full scope of the present invention, as set forth in the appended claims.

The invention claimed is:

1. A programmatic real-time bidding environment, comprising:

a resolution provider system comprising an application programming interface (API);

a publisher system comprising a publisher digital property configured to receive a personal identifier from a user browser and to transmit the personal identifier and a publisher-specific key to the resolution provider system by a call to the API across a network connecting the publisher system and resolution provider system, wherein the publisher-specific key corresponds to the publisher system from among a plurality of different publisher systems in the programmatic real-time bidding environment;

an identity graph implemented on one or more persistent storage devices and in communication with the resolution provider system, wherein the identity graph comprises a plurality of links, and wherein the resolution provider system is configured to search the identity graph using the personal identifier to identify a link in the identity graph corresponding to a person uniquely associated with the personal identifier;

a publisher key database implemented on one or more persistent storage devices and in communication with the resolution provider system, wherein the publisher key database comprises a plurality of envelope keys, and wherein the resolution provider system is configured to search the publisher key database using the publisher-specific key in order to find a publisher-specific envelope key from among the plurality of envelope keys;

at least one supply-side platform (SSP) configured to receive the envelope; and a sidecar in communication with the SSP configured to receive the envelope from the SSP and decrypt the envelope using the publisher-specific envelope key to produce a platform-encoded link, wherein the sidecar is implemented on one or more central processing unit cores operating at a base frequency of at least 2 GHz;

wherein the resolution provider system is further configured to encrypt the personal identifier using the publisher-specific envelope key to produce a publisher-specific encrypted identifier and create an envelope comprising the publisher-specific encrypted identifier, and to send the envelope from the resolution provider system to the publisher system through the API; and wherein the publisher system is further configured to set the envelope on the user browser as a first-party key.

2. The programmatic real-time bidding environment of claim 1, further comprising a publisher subnetwork association database in communication with the resolution provider system, and wherein the resolution provider system is further configured to receive a permissioned subnetwork indicator at the API, identify a subnetwork from within the real-time bidding programmatic environment by which to limit downstream use of the envelope by searching the publisher subnetwork association database, and return the subnetwork to the publisher system.

3. The programmatic real-time bidding environment of claim 2, wherein the sidecar is further configured to decrypt the envelope using the publisher-specific envelope key to produce the platform-encoded link in real time.

4. The programmatic real-time bidding environment of claim 3, wherein the SSP comprises at least one preferred SSP and at least one non-preferred SSP, wherein the preferred SSP is configured to access the publisher-specific envelope key to produce the platform-encoded link but the non-preferred SSP does not have access to the publisher-specific envelope key.

5. The programmatic real-time bidding environment of claim 4, further comprising a sidecar check in service (SCIS)

in communication with the sidecar, wherein the SCIS is configured to receive the subnetwork and the publisher-specific envelope key to allow access to a downstream DSP only if the downstream DSP is a member of the subnetwork.

6. A system for permissioned cookieless activation in a programmatic environment, comprising:

an identity graph, wherein the identity graph comprises a plurality of nodes corresponding to persons and edges corresponding to relationships between persons;

a publisher key database comprising a plurality of publisher keys corresponding to each of a plurality of publishers in the programmatic environment; and a resolution vendor system comprising:

an application programming interface (API);

one or more computer processors; and a memory space having instructions stored therein, the instructions, when executed by the one or more computer processors, causing the one or more computer processors to:

receive from one of the plurality of publishers a personal identifier entered at a user browser in communication with the publisher system and presented to the API;

receive from the one of the plurality of publishers a publisher-specific key presented at the API, wherein the publisher-specific key is associated with only the one of the plurality of publishers;

perform a search of the identity graph using the personal identifier in order to find a link in the identity graph at a node in the identity graph corresponding to a person uniquely associated with the personal identifier;

perform a search of a publisher key database using the publisher-specific key in order to find a publisher-specific envelope key corresponding to the one of the plurality of publishers;

encrypt the personal identifier using the publisher-specific envelope key to produce a publisher-specific encrypted identifier;

create an envelope, wherein the envelope is a data structure comprising the publisher-specific encrypted identifier; and send the envelope to the one of the plurality of publishers wherein the one of the plurality of publishers may set the envelope on the user browser as a first-party cookie.

7. The system of claim 6, wherein the memory space of the resolution provider system further has instructions stored therein, the instructions, when executed by the one or more computer processors, causes the one or more computer processors to:

receive a permissioned subnetwork indicator at the API;

identify a subnetwork from within the programmatic environment by which to limit downstream use of the envelope; and return the subnetwork to the one of the plurality of publishers.

8. The system of claim 7, further comprising a sidecar in communication with a supply-side platform (SSP) in communication with the one of the plurality of publishers, wherein the sidecar comprises:

one or more sidecar processors; and a sidecar memory space having instructions stored therein, the instructions, when executed by the one or more sidecar processors, causing the one or more sidecar processors to:

receive an envelope from the SSP, wherein the SSP has received the envelope after it was set at the user browser and read from the user browser; and decrypt the envelope using the publisher-specific envelope key to produce a platform-encoded link.

9. The system of claim 8, wherein the sidecar memory space further has instructions that, when executed by the one or more sidecar processors, causes the one or more sidecar processors to decrypt the envelope using the publisher-specific envelope key to produce the platform-encoded link in real time.

10. The system of claim 9, wherein the sidecar memory space further has instructions that, when executed by the one or more sidecar processors, causes the one or more sidecar processors to send the platform-encoded link to at least one downstream demand-side platform (DSP) in the programmatic environment.

11. The system of claim 10, wherein the sidecar memory space further has instructions that, when executed by the one or more sidecar processors, causes the one or more sidecar processors to transmit the envelope to a preferred SSP and a non-preferred SSP, wherein the preferred SSP has access to the publisher-specific envelope key to produce the platform-encoded link but the non-preferred SSP does not have access to the publisher-specific envelope key.

12. The system of claim 11, further comprising a sidecar check in service (SCIS) in communication with the sidecar, wherein the SCIS comprises:

one or more SCIS processors; and an SCIS memory space having instructions stored therein, the instructions, when executed by the one or more SCIS processors, causing the one or more SCIS processors to receive the subnetwork and the publisher-specific envelope key to allow access to the downstream DSP only if the downstream DSP is a member of the subnetwork.

13. A computerized method for permissioned cookieless activation in a programmatic real-time bidding environment, the method comprising the steps of:

at a publisher system comprising a publisher digital property, receiving a personal identifier from a user browser;

transmitting the personal identifier and a publisher-specific key from the publisher system to a resolution provider system, wherein the publisher-specific key is associated with only the publisher system from among a plurality of different publisher systems in the programmatic real-time bidding environment;

at the resolution provider system, performing a search of an identity graph using the personal identifier in order to find a link in the identity graph corresponding to a person uniquely associated with the personal identifier;

at the resolution provider system, performing a search of a publisher key database using the publisher-specific key in order to find a publisher-specific envelope key;

encrypting the personal identifier using the publisher-specific envelope key to produce a publisher-specific encrypted identifier;

at the resolution provider system, creating an envelope, wherein the envelope is a data structure comprising the publisher-specific encrypted identifier;

sending the envelope from the resolution provider system to the publisher system; and at the publisher system, setting the envelope on the user browser.

14. The computerized method of claim 13, wherein the resolution provider system comprises an application programming interface (API) to receive the personal identifier and the publisher-specific envelope key in an API call from the publisher system.

15. The computerized method of claim 14, wherein the envelope further comprises metadata.

16. The computerized method of claim 14, wherein the step of setting the envelope on the user browser comprises the step of setting a first-party cookie.

17. The computerized method of claim 14, further comprising the steps of:

receiving a permissioned subnetwork indicator at the API call of the resolution provider system;

in a publisher subnetwork association database, identifying a subnetwork from within the real-time bidding programmatic environment by which to limit downstream use of the envelope; and returning the subnetwork to the publisher system.

18. The computerized method of claim 17, further comprising the steps of:

after the envelope is set at the user browser, reading the envelope at the user browser and transmitting the envelope to a supply-side platform (SSP);

sending the envelope to a sidecar associated with the SSP;

at the sidecar, decrypting the envelope using the publisher-specific envelope key to produce a platform-encoded link.

19. The computerized method of claim 18, further comprising the step of, at the sidecar, decrypting the envelope using the publisher-specific envelope key to produce the platform-encoded link in real time.

20. The computerized method of claim 19, further comprising the step of sending the platform-encoded link from the sidecar to at least one downstream demand-side platform (DSP) in the real-time bidding programmatic environment.

21. The computerized method of claim 20, further comprising the step of transmitting the envelope to a preferred SSP and a non-preferred SSP, wherein the preferred SSP has access to the publisher-specific envelope key to produce the platform-encoded link but the non-preferred SSP does not have access to the publisher-specific envelope key.

22. The computerized method of claim 21, further comprising the step of, at a sidecar check in service (SCIS), receiving the subnetwork and the publisher-specific envelope key to allow access to the downstream DSP only if the downstream DSP is a member of the subnetwork.

* * * * *